United States Patent
Higginbotham

(10) Patent No.: US 6,192,623 B1
(45) Date of Patent: Feb. 27, 2001

(54) PLANT FEEDER FOR LONG TERM, LOW MAINTENANCE AND ACCURATE FEEDING OF POTTED PLANTS

(76) Inventor: Darroll W. Higginbotham, 1874 N. Carpenter Rd., Titusville, FL (US) 32796

( * ) Notice: Subject to any disclaimer, the term of this patent is extended or adjusted under 35 U.S.C. 154(b) by 0 days.

(21) Appl. No.: 09/253,932

(22) Filed: Feb. 22, 1999

(51) Int. Cl.[7] .................................................. A01G 29/00
(52) U.S. Cl. .................................................. 47/48.5
(58) Field of Search ........................ 47/48.5, 79

(56) References Cited

U.S. PATENT DOCUMENTS

| | | | |
|---|---|---|---|
| 419,242 | * | 1/1890 | Brown ..................................... 47/48.5 |
| 1,490,865 | * | 4/1924 | Van De Velde ......................... 47/48.5 |
| 2,145,934 | | 2/1939 | Kingman . |
| 2,375,860 | * | 5/1945 | Markham ................................ 47/48.5 |
| 2,380,721 | * | 7/1945 | Brigden ................................... 47/48.5 |
| 3,319,379 | * | 5/1967 | Groeber et al. ......................... 47/48.5 |
| 3,345,774 | * | 10/1967 | Delbuguet .............................. 47/48.5 |
| 3,755,966 | | 9/1973 | Smith . |
| 3,821,863 | | 7/1974 | Chan . |
| 3,900,962 | | 8/1975 | Chan . |
| 4,089,133 | * | 5/1978 | Duncan .................................. 47/48.5 |
| 4,158,269 | | 6/1979 | Williams et al. . |
| 4,361,983 | | 12/1982 | Wilson . |
| 4,393,622 | * | 7/1983 | Gallo, Sr. ............................... 47/48.5 |
| 4,393,633 | | 7/1983 | Gallo, Sr. . |
| 4,726,143 | * | 2/1988 | Steinbeck .............................. 47/48.5 |
| 4,745,706 | * | 5/1988 | Muza et al. ............................ 47/48.5 |
| 4,870,781 | | 10/1989 | Jones . |
| 5,060,420 | * | 10/1991 | Bergman ................................ 47/78 |
| 5,533,300 | | 7/1996 | Kesler . |
| 5,558,030 | * | 9/1996 | Ward ..................................... 47/48.5 |
| 5,720,129 | | 2/1998 | Lantinberg . |

* cited by examiner

Primary Examiner—Michael J. Carone
Assistant Examiner—Jeffrey L. Gellner
(74) Attorney, Agent, or Firm—Julian C. Renfro, Esq.

(57) ABSTRACT

A plant feeder for supplying nutrition to a plant over a prolonged period of time by the use of slow release fertilizer pellets that require substantially constant moisture for continual release of nutrients, which plant is growing in soil in a container in which container a demarcation line may exist between soil that is acceptably moist to the fertilizer pellets, and soil that is unacceptably dry, which line of demarcation may move up or down the container as a result of the ever-changing amount of water present therein. The present novel feeder comprises a generally cylindrical casing having an apertured upper end, and a somewhat pointed lower end to simplify insertion among the roots of the plant. The casing has an elongate internal compartment, with a lower portion of the compartment adapted to contain a number of coated pellets involving slowly-releasable nutritional material, and an upper portion equipped with a moisture-retentive component intended for the gravity feeding of moisture to the pellets so that they will be supplied with substantially constant amounts of moisture, to insure a gradual, uninterrupted, internal dissolving and nutrient release of the coated pellets. A number of relatively small holes disposed in a lower part of the lower compartment so that nutrition from the slowly-releasing pellets can be steadily supplied over a long time period to the soil of the container, thus to assure a proper and continuous amount of nutrition reaching the roots of the plant despite an intermittent application of water to the container.

29 Claims, 3 Drawing Sheets

PLANT FEEDER FOR LONG TERM, LOW MAINTENANCE AND ACCURATE FEEDING OF POTTED PLANTS

BACKGROUND OF THE INVENTION

1. Field of the Invention

This invention relates to the long term care of potted plants, and in particular to a novel plant feeder compartmented so as to contain slow-release fertilizer pellets for providing nutrition to the potted plant over a long period of time, with a portion of the feeder above the pellets utilizing sponge-like material serving as a source of moisture, to assure sufficient moisture for proper activation of the slow release pellets, despite irregular watering of the plant by the caretaker.

2. Description of the Prior Art

It has long been known to utilize fertilizer-containing devices that are to be inserted into the ground adjacent the roots of a plant, tree or bush to provide nutrition over a relatively long period of time.

One example of this type of device is represented by the Kingman U.S. Pat. No. 2,145,934 entitled "Plant Irrigating and Feeding Device." Kingman's device is conically shaped for easy insertion adjacent the roots of a growing plant, and adapted to contain a mass of saturable or absorbent material capable of taking up water and preferably containing fertilizer of a soluble character. However, the Kingman patent is not suitable for use with potted plants for a variety of reasons, and by way of example, this patentee says nothing about his feeder being constructed to proportionately match the size of a typical indoor potted plant so that the feeder could hold a sufficient amount of fertilizer to provide nutrition to the plant over a prolonged period.

In addition, although Kingman utilizes in his device a mass of saturable or absorbent material charged with fertilizer of a soluble character, his sponge-like material serves an entirely different purpose than that involved in the instant invention. Kingman's sponge is designed to absorb a soluble fertilizer and then, as water migrates down through the sponge, the fertilizer is carried out to the roots of the plant. Entirely missing is the use of new technology fertilizer having a "slow release" characteristic that will provide nutrition to the plant over a period of many months.

Continuing with Kingman's device, although the nutrients will rapidly migrate out of his feeder, this presents no big problem inasmuch as his feeder is intended to be located in the ground, meaning that there is plenty of earth to absorb these nutrients, with any possible overdosing of the plant or tree not being a factor. In contrast, if the Kingman feeder were to be used in conjunction with a potted plant, substantially all of the fertilizer nutrients would likely wash out of his soluble fertilizer and into the soil contained in the pot in a short period of time. A potted plant equipped with the Kingman device would doubtless be overdosed, and decline rapidly.

The Smith U.S. Pat. No. 3,755,966 entitled "Deep Root Feeder and Tree Irrigater" involves the use of an elongate, cylindrical canister filled with fertilizer pellets, and designed to be used for providing nutrients to a large tree, as depicted in FIG. 4 of the Smith patent. Smith's housing is stated to be 18" long, with an outside diameter of 4", and designed to receive a canister having an open top and holes in the bottom. The canister is to be filled with fertilizer and gravel, with water entering the top of the device filtering down and ultimately reaching the roots of the tree. Because of its size and shape, it would be necessary for the gardener to dig an initial hole in the ground in the vicinity of the tree to receive the Smith device.

From studying the Smith patent it can be concluded from the size of the holes provided in the bottom of his device and the type of compressed fertilizer pellet/tablets used, that the fertilizer contained in the device will rapidly run into the ground and be absorbed. This is no particular problem when used outdoors, but as pointed out in connection with the Kingman device, a relatively unlimited amount of a fertilizer applied to the roots of a potted plant would likely cause the rapid demise of such a plant within a short time.

The Smith patent does not attempt to design and size a feeder device to structurally relate to a household potted plant. The subject matter that Smith presents is designed to relate to an entirely different structure, i.e., a large landscaped tree, with deep roots, planted in an urban area with most if not all of the ground surface around the tree paved. The purpose of this device is to provide a route for surface water to flow down to the root system, and dissolve a portion of the fertilizer pellets incased in his root irrigater/feeder.

Although Smith utilizes terms such as fertilizer pellets and time-release nutrients in his patent, it is to be understood that these terms as used by Smith relate to products of different structure and construction. The pellets/tablets he uses have a considerable amount of fiber residue—no coating technology. The nutrient fiber is mixed with a binder and compressed into different sizes and shapes. This technology is, comparatively speaking, rather crude, but when cycled wet/dry/wet it is true that a slow-release effect is obtained.

After extensive testing, it was found that in a constantly damp environment, as is to be found in many potted plants, the binder Smith uses breaks down very fast—overnight in a glass of water, and releases its nutrients. One reason Smith mixes gravel with his pellets is to let them dry out between rainfalls, to keep them from breaking down too soon. It is therefore obvious that the Smith teaching cannot be used in connection with a potted plant in an instance in which the design goal is to supply nutrition to the plant over a prolonged period of time.

The Chan U.S. Pat. No. 3,821,863 entitled "Controlled Fertilizer Feeder" is an intricate device involving a top compartment threadedly connected with a bottom compartment having a pointed configuration. The top compartment is provided with a closure cap as well as with annularly arranged apertures located approximately midway between the top and bottom of the compartment. Depending from the closure cap is a canister arranged to contain a plant fertilizer such as potassium nitrate and phosphate, with apertures provided at the bottom of the canister in communication with the top compartment. Iron bars are provided in the bottom compartment to provide a source of rust. After the pointed lower portion of the device has been driven into the ground in the vicinity of a tree, the ground is watered, causing water to flow into both the top compartment as well as the bottom compartment. As the water level rises in the top compartment above its apertures, the water will flow out through the passageway and orifices, carrying with it a measured amount of fertilizer from the top compartment into the bottom compartment. Obviously, this is a needlessly complex and expensive device.

Chan is referred to repeatedly as a "ground" fertilizing device. No teaching is set forth with regard to an arrangement that can be effectively used with a potted plant when the design goal is to supply nutrition to the plant over a prolonged period of time, and when taking into consideration the many structural parameters that must be dealt with concerning potted plants.

The intricate and multiple layers of Chan's structure dictates that the construction of his device be of considerable bulk. Something of this size and shape would be damaging to the root system of a potted plant. This point alone drives it to be used for outside plants that have root systems extending into the ground.

Also to be noted is the fact that Chan uses a water-soluble fertilizer and then utilizes a very intricate design to regulate water flow into the device, which in turn regulates how much of the soluble nutrients overflow and exit to the root system. To enable a water soluble fertilizer to be used in an appropriate manner, the user must set apertures and thus give the user the capability of regulating the water intake to stretch out the time required for total release, while still nourishing the plant correctly. However, without a truly effective control on the amount of water presented to the device, it becomes difficult if not impossible to set the water inflow apertures to some predetermined fertilizer release amounts or time involved that will be appropriate in each circumstance.

The Williams et al U.S. Pat. No. 4,158,269 entitled "Nutrient Dispersal Device" involves a hollow elongate cylindrical body section having a cap section, an apertured body section and a lower tip. One of the key aspects of the device involved the fact that the body section is of lesser diameter than the tip section, with the relatively large hole created by the tip section entering the soil preventing the soil blocking the dispersal apertures of the body section of lesser diameter. The Williams device utilizes liquid soluble plant nutrients upon the upper surface of which a spherically shaped flotation device is designed to rise and fall with the liquid level within the body section. The flotation device is designed to float into contact with the underside of the cap at the time of a heavy rainstorm, thus to prevent the entry of liquid at a rate exceeding the dispersal rate. This device, also, is a needlessly complex and expensive, and entirely unsuitable for use in conjunction with a potted plant.

Although the Williams device is designed to be installed in the ground, it could perhaps be sized such that it would fit into most potted plants. However, in latter circumstance it would appear that the flotation ball would not perform its intended function inasmuch as when liquid nutrients exit the feeder during rainfall, the ball would lower a little and immediately take on more water.

With open apertures up and down the side and with water-soluble fertilizer, there just is not anything that could be done in connection with the Williams device to slow down the release of nutrients. The nutrients would be dispersed in a short period of time, and that quantity would cause the quick demise of a potted plant.

The Kesler U.S. Pat. No. 5,533,300 entitled "Plant Feeder and Method for Feeding Plant Roots" involves a device having a water reservoir and a water conduit connected to the reservoir at one end. The other end of the water conduit is adapted to be positioned adjacent the roots of a plant to be fed. Because of the use of a water permeable plug with water soluble plant food therein, water can percolate through the conduit from the reservoir to the roots of the plant, so as to provide nutrition thereto. The patentee mentions approximately one-half of the plant feeder extending above ground. It is to be seen that the rapid dispersal of the fertilizer nutrients will likely take place, which in the case of a large tree, will cause no harm. However, if the Kesler feeder is used with a potted plant, the rapid dispersal of the fertilizer nutrients into the pot would cause a premature death of the plant.

It is therefore obvious that few if any of the devices of the prior art have been concerned with the utilization of a relatively inexpensive, reusable device for the effective and proper feeding of a potted plant over a relatively long period of time without endangering the plant due to overfeeding.

SUMMARY OF THE INVENTION

In its primary embodiment, my novel plant feeder is in the shape of a casing of generally cylindrical configuration open at one end, and closed to a point at the other end. A series of small, circumferentially located holes are located in the casing sidewalls, which holes extend along the lower length of the cylindrically shaped device. Approximately the lower half of the casing is filled with coated, slow-release fertilizer pellets, whereas the top half is filled with moisture absorbent material, typically sponge material. A stopper or closure plug is located at the top or open end of the device, and an information tag is attached to the upper portion of the feeder. The tag provides instructions on the management of the plant feeder. Most importantly, the tag advises the caregiver when to dump out the remnants of the previous batch of pellets, and to insert a fresh supply.

Because of its slender and pointed configuration, my novel device is suitable for ready insertion, without damage, into the root zone of a potted plant, where substantially constant moisture is located to activate the pellets. Intermittent overhead watering of the plant serves to keep the root zone, fertilizer pellets and the sponge material damp. Through gravity movement and capillary flow of the moisture, soluble nutrients from the fertilizer pellets migrate through the holes in the lower cylinder sidewalls into the root zone for use by the plant. I prefer in accordance with this invention to utilize slow releasing pellets with a semi-permeable resin or polymer coating. In some instances the pellet mixtures involve some pellets with relatively thin coatings, and other pellets with relatively thick coatings. In this way, a given mixture of pellets can involve the time of release of nutrients being staggered over many months, rather than all of the pellets becoming active at the same time, and then becoming ineffective at the same time.

Slow-release fertilizers manifestly require moisture to activate, and constant moisture is needed to achieve continual, even nutrient release. Repetitive waterings are required to effectively dissipate and distribute the released nutrients. The rate of release of the more popular and widely distributed slow-release pellet fertilizers is of course controlled by the different amounts and thicknesses of the coating and the ambient soil temperature, with the soil temperature usually in the Fahrenheit range of 70° to 80°. With their longevity, these fertilizers have significantly reduced the requirement involving high maintenance and frequent, intermittent applications of nutrients to potted plants.

It is to be noted that the pot or container in which a plant is growing has what may be regarded as an upper zone which, between waterings, alternates between wet, and something less than wet, including dry. The pot or container also has a lower zone, in which the soil alternates between wet and moist, with this lower zone, if it becomes dry, placing the survival of the plant in considerable jeopardy. It is therefore a very important goal of my invention to provide a plant feeder serving to effectively prevent the pellets contained in the lower zone of the plant feeder from ever drying out. By utilizing a moisture-containing sponge to prevent the pellets from drying out, which would have greatly inhibited their performance, the pellets can be expected to promptly start again in the supply of nutrition to the root zone of the plant when proper watering of the plant resumes.

The volume of my novel plant feeder is a function of its area times its length. Inasmuch as approximately one-half of the volume of my novel plant feeder is intended to contain the slow-release pellet mixture, it is therefore necessary to determine the length, diameter and volume of the moisture absorbent material, typically sponge material, to be utilized. Experience has shown that ¼ fl. oz. (0.45 in$^3$) of the slow release fertilizer pellets is the amount needed to service a potted plant for one year. Although my feeder could involve many different shapes and sizes, only a narrow range will functionally work. I have found the biggest driver in the design of my plant feeder is its diameter. On the one hand, it is desirable to shape the pellets into a slender column so as to assure ample exposure of the pellets to the surrounding soil, thus to assure satisfactory performance. On the other hand, if the diameter of the pellet-containing portion of the feeder becomes too small, this causes the column of pellets to be raised out of the assured lower moisture zone of the pot or container, which could inhibit the proper functioning of my device.

Another consideration in the design of an optimum feeder involves the length of the device, which is to be as long as possible in order that the volume of the sponge will be such as to hold as much moisture as possible. This is of importance inasmuch as sufficient moisture must be provided to the slow-release pellets over a protracted period of time. During the period in which the potted plant is receiving ample watering, the upper or dry zone of the potting soil is comparatively small and the water added to the pot during watering enters the reservoir cap and the numerous holes provided in the sidewalls of my generally cylindrically shaped device, keeping the pellets of fertilizer amply moist. On the other hand, if the plant has not been recently watered, the dry zone becomes larger, and the line of demarcation between the wet and dry zones of the soil in the pot becomes lower. At this time the moisture laden sponge provided in the upper part of my novel plant feeder advantageously comes into play, and moisture from the sponge flows down among the pellets, keeping them moist and active.

If the diameter of my novel device results in reduction of the volume of the sponge to half that of the pellets, this reduces its ability to hold much "contingency" water, therefore making it less effective. I have found that the moist/dry demarcation line in the pot or container is what may be regarded as a "moving target," and it is at a different elevations on different sized pots the plant feeder is designed to service. It is therefore desirable to establish an average column height for the pellets, one that represents the least threat of the pellets drying out during periods of scant watering.

Another factor that must be taken into consideration is the ability of my novel plant feeder to be effectively contained in pots of containers of several different sizes. On the one hand the plant feeder must be long enough to reach the moist root zone of a plant growing in a large container, but on the other hand, it must not be so long that in a somewhat smaller container the upper part of the plant feeder extends well above the surface of the soil in the pot after the lowermost part of the feeder is touching the bottom of the pot. This would detract from the plant esthetics.

I utilize a tag on the uppermost portion of my device displaying a date signaling the time that the plant feeder should be removed from the pot, emptied of used nutrients, refilled with fresh fertilizer, and then re-inserted into the potting soil. Because of the highly advantageous configuration of my maintenance-free device, when it has been charged with the proper slow-releasing fertilizer pellets in the correct amount, my device will safely feed the potted plant for more than one year before recharge becomes necessary. Ideally, watering should take place no less often than once every seven to ten days.

It is therefore a primary object of my invention to provide a low cost plant feeder device designed to provide safe amounts of nutrition to a potted plant over a prolonged period of time, while necessitating only minimal care.

It is another object of my invention to provide a plant feeder usable by a caretaker possessing relatively little prior knowledge of how to care for a potted plant, which device can provide nutrients to the plant on a safer, essentially maintenance-free basis for a substantial length of time.

It is yet another object of my invention to provide a low cost plant feeder device advantageously compartmented so as to define an upper, sponge-containing portion and a lower portion containing coated, slow-release fertilizer pellets, with the arrangement being such that the sponge-containing portion will assure a sufficient amount of moisture for proper activation of the pellets as will cause even, uninterrupted amounts of nutrition to be provided to the roots of a potted plant over a prolonged period of time.

It is yet still another object of my invention is to provide a sponge or moisture retentive component effectively preventing pellet dry-down during periods of scant watering, thus preventing "shutdown" of the extra long term pellets and keeping the pellets in a "ready state," such that when the caregiver resumes proper watering of the plant, the pellets will be ready to provide immediate nutrition to the root zone of the plant.

It is yet still another object of my invention to provide a novel plant feeder of generally cylindrical configuration having a water catch-basin at the top to facilitate water entry, and a series of holes in its sidewalls allowing a ready exchange of moisture, such as an influx of fresh moisture when the plant is watered, and a migration out of the device with nutrient-laden moisture as the water flows downwardly under the influence of gravity during a relatively dry period, such that the nutrients will be taken up by the roots of the plant.

It is a still further object of my invention to provide a plant feeder to control excess fertilizer salts build-up in potted plants by retaining the used fertilizer pellets for easy removal, discard, and recharge with fresh pellets, thereby eliminating residual salts discharge from the used pellets.

It is thus to be seen that I have provided a potted plant feeder sized to ideally relate to numerous structural parameters including being:

Small enough to be esthetically out of sight;

Large enough to hold at least one years supply of nutrients suitable for the majority of potted plants;

Pointed and slender enough to be pushed down into a potted plant's root zone without disrupting the plant/root/soil environment;

Diameter and length such that the fertilizer pellet mass is shaped to ensure maximum exposure to the surrounding potting soil/root structure; and Diameter and length such that the fertilizer pellet mass is placed mainly in the moist root zone of the majority of the many different sized plant containers.

These and other objects, features and advantages of my invention will become apparent from a study of the appended drawings.

DETAILED DESCRIPTION

Figure 1:
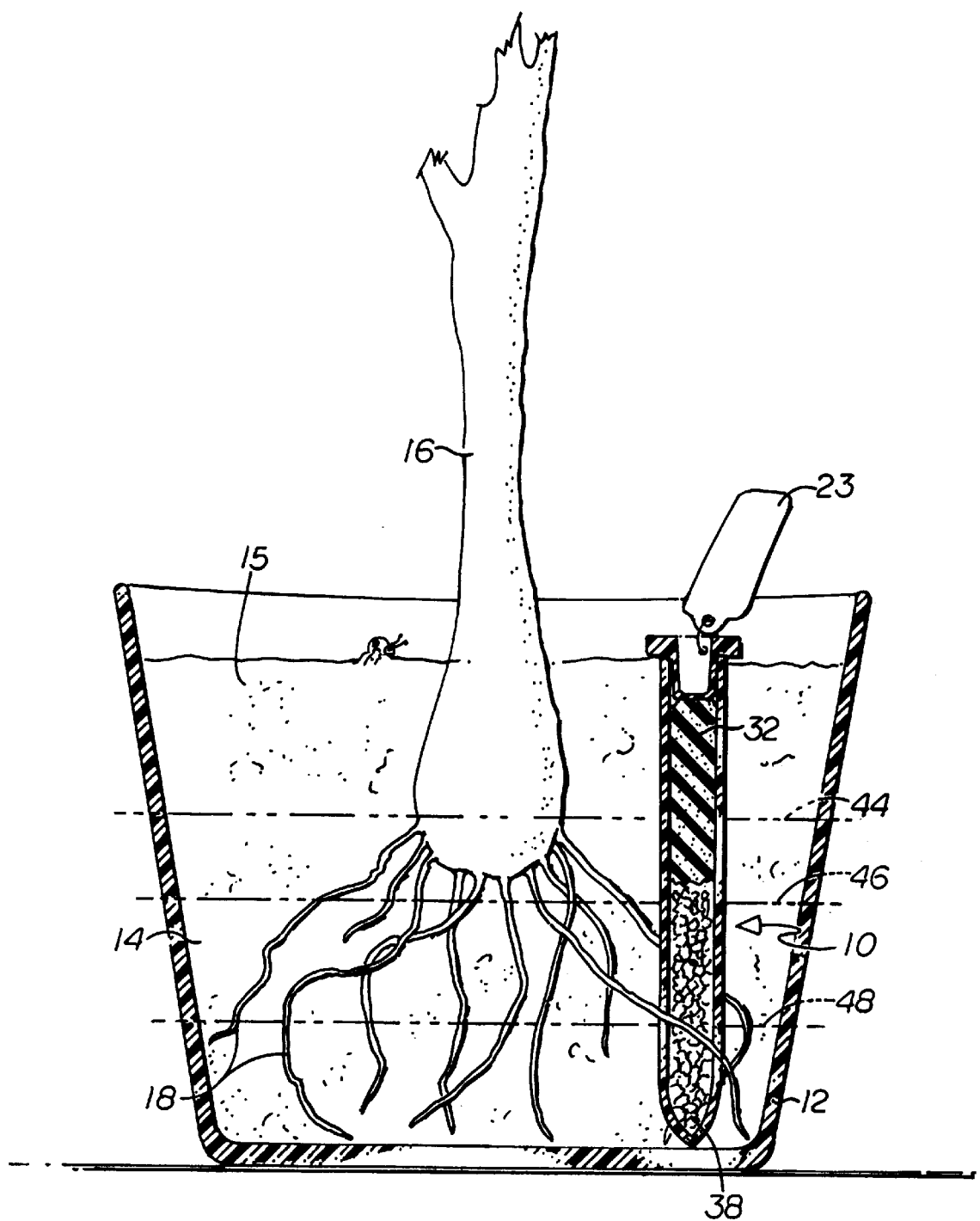
FIG. 1 is a sectional view through a typical pot or receptacle in which a plant is growing, with one of my novel plant feeders having been inserted into the root structure of the plant, to provide nutrition to the roots over a protracted period of time.

With initial reference to FIG. 1, it will be noted that I have depicted an exemplary embodiment of my novel plant feeder 10 containing coated fertilizer pellets for supplying nutrition to a potted plant over a prolonged period of time. In this instance the plant feeder is disposed in a pot or container 12 in which potting soil 14 is disposed. It will be noted that the surface of the soil in the pot is shown at 15, with my novel plant feeder 10 having been inserted so deeply into the soil that only the uppermost portion of the feeder 10 is slightly visible from the upper surface of the container 12.

In FIG. 1 I have illustrated a plant 16 which has roots 18 extending through a considerable portion of the soil 14 in the pot. A line of demarcation 44 is depicted to exist between soil located generally in the lower portion of the container that is acceptably moist to the fertilizer pellets 38 contained in the lower internal portion of the feeder 10, and unacceptably dry soil that from time to time may be located in the upper level of the container 12. This line of demarcation between relatively dry and relatively moist may move up or down the container as a result of the ever-changing amount of water present therein. The reasons why this as well as other lines of demarcation such as lines 46 and 48 are called out in FIG. 1 will be discussed hereinafter.

As will later be explained, it is the purpose of my novel feeder 10 to release nutrition from the coated pellets 38 at locations near the roots 18 of the plant, so that over an extended period of time, the nutrients will migrate into the soil in which the plant is growing. I utilize pellets 38 to which a coating of desirable thickness has been applied, with these pellets involving nutritional material designed to be slowly released. As one example of this type of pellet, a resin or polymer coating can be applied to each pellet, with this coating specifically designed to dissolve very slowly in the presence of moisture. Because of this slowly dissolving coating on the pellets, the release of its nutritional material into the soil of the container is prolonged for a desirable length of time. By the use of a mix of pellets having various thicknesses of coatings, it is readily possible to stagger in a highly advantageous manner, the time of release of nutritional material from the pellets, so that proper and consistent nutrition can be provided to the plant over a comparatively long period of time.

To enable the date for recharging the feeder with new nutritional material to take place at the appropriate time, I prefer to attach an information tag 23 of durable construction to an upper portion of the feeder. The tag 23, which is visible in FIGS. 1, 2, 3 and 4, may be of hard plastic, upon which the date may be written with a permanent marker. The tag is preferably attached in such a manner that it can lie on the surface 15 of the soil in an inconspicuous manner. In many instances, my novel feeder can be expected to provide nutrition for periods of one year or longer before recharging becomes necessary.

Figures 2, 2A:
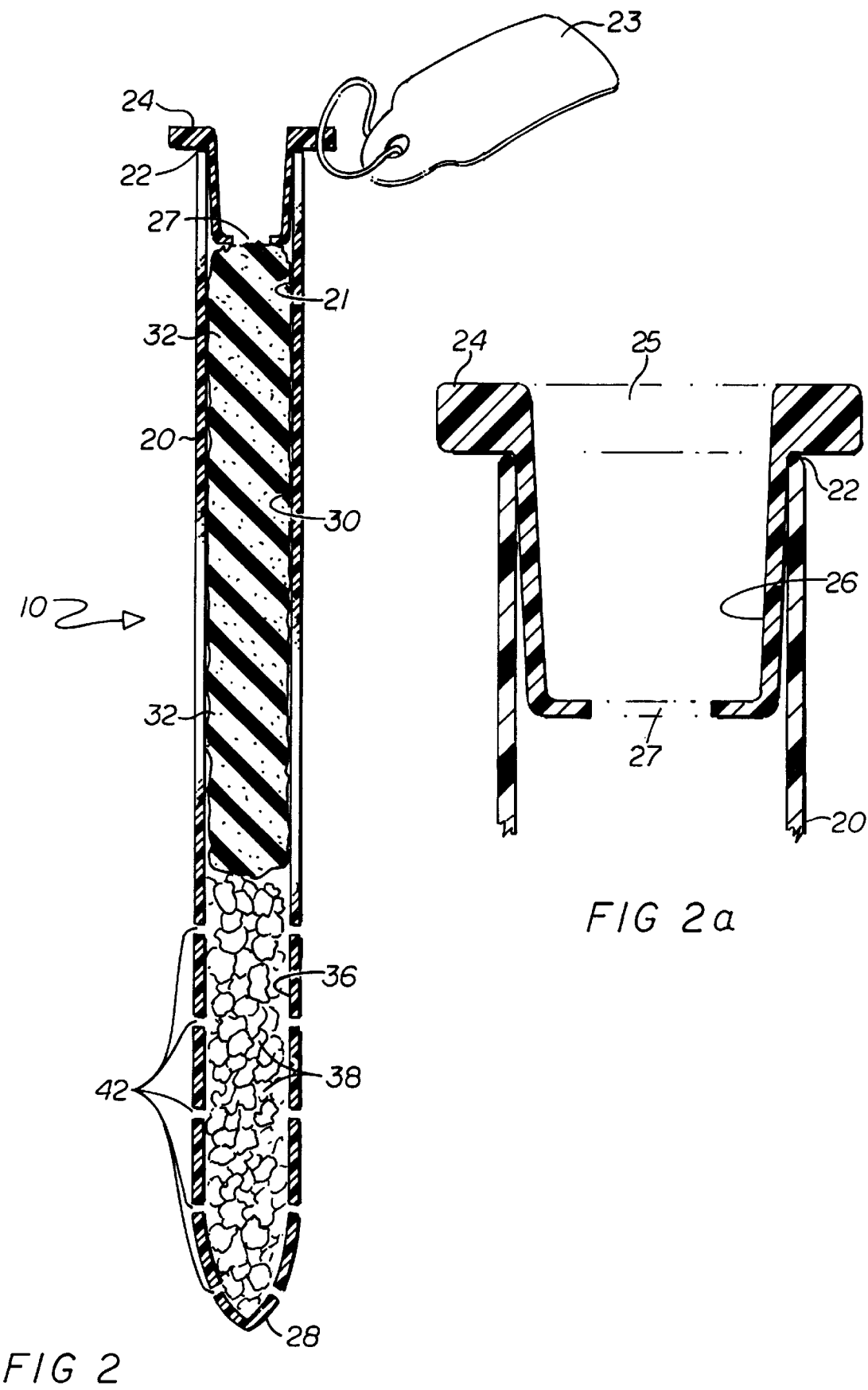
FIG. 2 is a view to a somewhat larger scale of my novel plant feeder removed from its normal environment in order to reveal more details of its construction.
FIG. 2a is a view to a still larger scale, provided so as to show the catch basin I may utilize adjacent to or integral with the stopper or closure.

Turning to FIG. 2, where my novel plant feeder 10 is shown to a larger scale, it will be noted that the feeder principally comprises a casing 20, which may be made of transparent plastic or other suitable material. The casing 20 is of generally cylindrical configuration with an apertured upper end 22, and a somewhat pointed lower end 28. The upper end 22 is configured to receive a stopper or other closure 24, whereas the lower end is configured so as to simplify the insertion of the feeder into the soil of the container 12 in a manner non-damaging to the roots 18.

The casing 20 has an elongate internal compartment 21, with an upper portion 30 of the compartment 21 being equipped with an elongate, moisture-retentive component 32 intended to receive and retain a quantity of water. The component 32 is of elongate configuration, being of a length 10 to 15 times its width. As an example, the component 32 may be an open cell sponge capable of retaining as much as 10 times its weight in water. By being made of polyvinyl alcohol, this type of material is resistant to sunlight and ultraviolet rays, and highly resistant to chemicals associated with fertilizers. Because of the attributes of this material, from time to time I may refer to this item as a high density, high absorption sponge.

A lower portion 36 of the internal compartment 21 is directly below the upper portion 30 of the compartment 21, with this lower portion being adapted to contain a number of the previously-mentioned coated pellets 38. In accordance with this advantageous design, these pellets are directly supplied with substantially constant amounts of moisture moving downwardly from the moisture retentive component 32, which causes the pellets to gradually release nutrients in a highly desirable manner.

Whereas the upper sidewall of the casing 20 in the vicinity of the sponge 32 and the upper portion 30 is imperforate, a number of relatively small holes 42 are disposed in the casing sidewall in the vicinity of the lower portion 36 of the internal compartment 21. In this way, nutrition from the slowly-releasing pellets can be steadily supplied in small quantities over a long time period to the soil of the pot or container, so that the plant can be expected to thrive despite not receiving frequent attention.

With regard to the size of holes 42, approximately fifteen holes each approximately 3/32" diameter can be spaced around the lower portion 36 of the compartment 21, to effectively provide pathways for the migration of moisture-carried nutrients to the surrounding root zone.

It is to be noted that the elongate, moisture-retentive component 32 is fitted comparatively loosely in the upper portion 30 of the elongate internal compartment 21, and upon being wetted, this component serves as a reserve source of water for providing an uninterrupted supply of moisture to the coated pellets over a protracted length of time. This serves to keep the coated fertilizer pellets 38 desirably moist and therefore effective, despite irregular applications of water to the container and the plant growing therein.

With reference to FIG. 2*a* it can be seen that the stopper or closure 24 has been inserted into the open upper end 22 of the casing 20, and it will be noted that the stopper or closure 24 is provided with a central aperture 25. Adjacent the underside of the cap or stopper 24 is what may be regarded as a recessed catch basin 26, with the catch basin preferably being integral with the stopper 24. In the bottom of the catch basin 26 is an aperture 27. At the time the plant is being watered, a considerable amount of this water can be expected to enter the central aperture 25, with the catch basin 26 serving to funnel the applied water directly onto the high density, high absorption sponge 32. This serves to fill the sponge with water, to be later utilized for keeping the fertilizer pellets moist and therefore effective during intervals between waterings.

As has now been made abundantly clear, the lower portion 36 of the compartment 21 of my novel plant feeder is adapted to contain a number of coated pellets 38 involving slowly-releasing nutritional material. Because the sponge 32 is located directly above the pellets, the pellets can readily be supplied with moisture from this highly moisture retentive component 32. As long as the fertilizer pellets continue to be supplied with moisture, some of the pellets will gradually release, and some will be preparing to release in the future, so that over an extended period of time, the nutrient will migrate through the small holes 42 in the lower casing, into the soil 14 in which the plant 16 is growing, thus to supply measured amounts of nutrition to the roots 18 of the plant 16. As mentioned hereinabove, the time of release of nutritional material from the pellets can be staggered, so that without attention from the caregiver, proper nutrition can be provided to the plant over a comparatively long period of time.

The maximum volume of the moisture retentive component or sponge 32 utilized in the upper portion 30 of the compartment 21 of my plant feeder could range up to 2.5 times the pellet volume and still meet the requirements for the most practical and accurate device for applying long term slow-release fertilizer technology to indoor potted plants.

Figure 3:
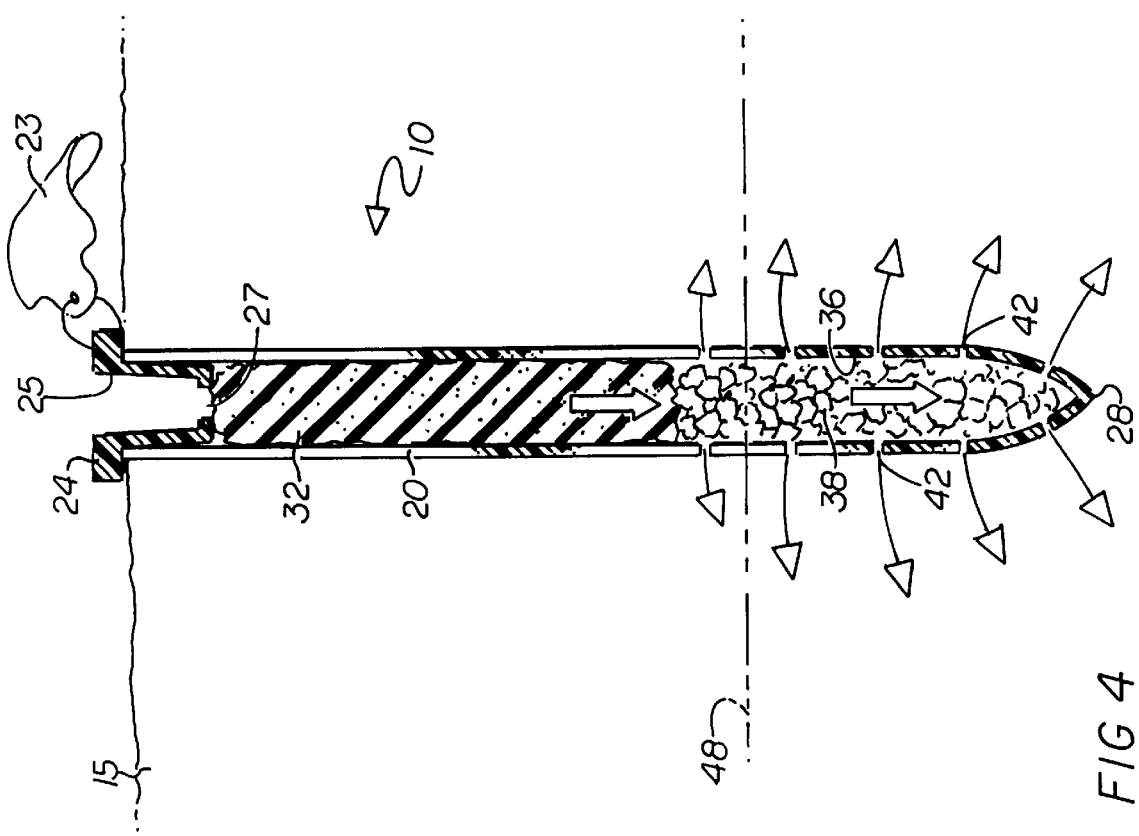
FIG. 3 is a view of my novel plant feeder shortly after water has been sprinkled into the pot in which a plant is growing, with the multiple arrows shown on this figure revealing how moisture can enter into the pellet area through numerous holes provided in the catch basin and sidewalls of the plant feeder.

Turning now to FIG. 3, it will be observed that I have here illustrated what is considered to be an ideal design of my plant feeder, with arrows utilized to show, in a generalized manner, the flow of water into the lower portion of my novel plant feeder during periods in which the caregiver is providing water to the soil contained in the pot or container 12.

Depicted in this drawing are the pellets 38 in the lower portion 36 of the elongate compartment 21 of the feeder body, with the utilization of ¼ oz. of pellets being typical. As is well known to those skilled in this art, coated, slow release pellets of the above-described type are manufactured world wide, and are readily available through most fertilizer distributors.

In a preferred embodiment, the casing 20 of the feeder may have a ⅝" outer diameter, and a ½" inner diameter, although it is obvious that I am not to be limited to these dimensions. In most instances, an outer diameter of ⅝" is the maximum desired inasmuch as anything larger than this makes the insertion of the feeder into the potting soil difficult, and in addition may well damage some of the roots of the plant.

It is to be assumed that when the plant feeder is being inserted into a pot or container, it will be inserted sufficiently deeply that all the pellets contained in the lower portion 36 of the casing will be located down in the moist root zone of the container 12; note FIG. 1. In the typical instance, approximately 4" of the feeder casing is located above the pellets for accommodating an ample amount of sponge material.

Dimensions vary from container to container, and watering techniques vary from caretaker to caretaker, but generally the soil in the upper portions of a pot or container will experience wet/dry cycles at least occasionally. The upper zone of potting soil will typically alternate between waterings from wet to something less than wet, including relatively dry soil.

The sponge or moisture retentive component 32 typically resides in a relationship with the dryer area of the potting soil profile, and as will be recalled, the casing in the vicinity of the sponge 32 is imperforate. As previously mentioned, all moisture received by the sponge 32 takes place during the application of water to the pot or container 12, at which time water enters the central aperture 25 of the stopper, thereafter passing downwardly through the aperture 27 located in the bottom of the catch basin 26.

It is to be noted from FIG. 3 that during watering, the water floods down on and around the plant feeder, and at this time the sponge 32 is filled as a result of water flowing through the aperture 25 of the stopper and the aperture 27 of the catch basin. Also occurring at this time is the wetting of the pellets 38, as indicated by the numerous arrows applied to this figure. As indicated by these arrows, during the application of water to the container, water flows from the soil surrounding the feeder into the pellet area through the numerous small holes 42, supplying a desirable amount of moisture to the pellets 38. During this phase, the moist soil exists to a relatively high point in the container 12, with this being indicated by the relatively high location of the line of demarcation 44.

Figure 4:
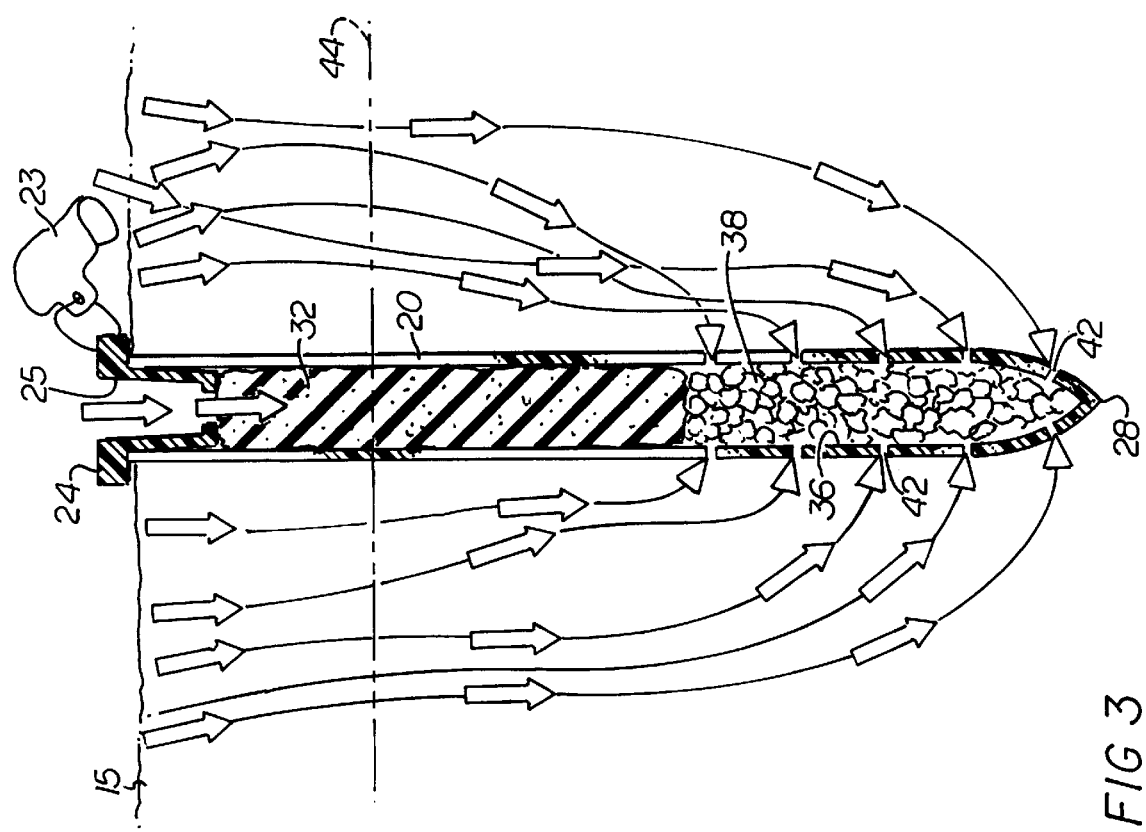
FIG. 4 is a view of my novel plant feeder when an extended period of time has elapsed since water was sprinkled into the pot in which a plant is growing, with arrows revealing how moisture can move downwardly from the sponge into the pellet area, with multiple arrows showing how the nutrient rich moisture can move out into the root area of the plant.

Turning now to FIG. 4, I have here illustrated my feeder device 10 in a circumstance in which an extended period of time has passed since water was last applied to the pot or container 12. For purpose of illustration, let it be assumed that in this instance the plant (not illustrated in this figure) was allowed to dry down excessively since the watering cycle. It is to be understood that I prefer to utilize a fertilizer mix of lightly coated, medium coated and heavily coated pellets, and it is important to realize that the extra long term pellets 38 in the fertilizer mix must stay moist at all times or they will "shut down" and require weeks/months more of constant moisture to begin working again. To combat this problem, I have designed the shape, volume and construction of my feeder casing 20 such that it advantageously places the pellets 38 in a moist environment in which they are effective.

The design, shape, volume and construction of my novel feeder also places the sponge 32 in a very strategic position, with its purpose being to reside in the dry zone above the line of demarcation 44 in the pot 12 and to hold extra moisture in reserve. This is very important, for if the potting soil dries down, such as to the a position corresponding to the relatively low line of demarcation 48 depicted in FIG. 4, this threatens to dry out and drastically inhibit the functioning of the pellets, particularly in a deep pot or container. It is in the circumstance of a threatened dry down of the soil in the container that the location of the sponge directly over the fertilizer pellets in my novel plant feeder comes into play.

As indicated by the single downwardly directed arrow in FIG. 4, the reserve moisture in the sponge 32 continues to gravity-feed onto the pellets 38 during a dry condition, helping to ensure that the pellets stay moist until the next watering. Indicated by the group of outwardly directed arrows in FIG. 4 is the flow of nutrient-laden moisture outward through the numerous holes 42 located in the lower portion 36 of the compartment 21. This outward flow of nutrient-laden moisture is of course of vital importance to the continuing health of the plant.

During the time of active watering of the plant, some of the applied water pours down the sides of the sponge and nutrients flow outwardly. I have found that between waterings if the surrounding soil is moist, nutrients will migrate out by capillary action. If, however, there is a dry condition in the soil surrounding the part of the feeder containing the pellets, there will be very little if any moisture/nutrient flow outward. It is most important to note that the purpose of the sponge comes into play at this point, for the sponge will continue to supply, under the influence of gravity, moisture downwardly onto the pellets. Although it is of course quite undesirable for the root zone of the plant to be deprived of adequate moisture, it is significant to note that by the functioning of the sponge or moisture retentive component 32, pellet dry-down is obviated under such condition, thus preventing "shutdown" of the extra long term pellets. Because of the sponge keeping the pellets in a "ready state," when the caregiver resumes proper watering of the plant, the pellets will be ready to provide immediate nutrition to the root zone of the plant.

Returning to a further consideration of FIG. 1 and with regard to the pot or container 12 used in connection with my novel plant feeder, it is to be realized that each pot holds the plant, water, nutrients and the potting soil. Unlike a plant growing in the ground, the existence of a potted plant revolves around a proper management of the moisture and nutrients in the pot or container. As is obvious, with a plant growing in the ground, the roots can spread widely and deeply in order to gather moisture from a large volume of earth. The roots are free to go deep, where there is usually a reservoir of moisture from past sprinkler irrigation or rain. If a watering is missed, the plant growing in the ground has a good chance of surviving because of the possibility of rain, and the fact that the roots may extend deep enough to find the moisture needed for the survival of the plant. Another advantage possessed by a plant growing in the ground is that a small amount of natural nutrients are available in the earth. If a "ground" plant is not artificially fertilized, there is a good chance of it surviving, and doing well based on the likely availability of naturally occurring ground nutrients. In contrast with this, potting soil is usually devoid of any natural nutrients, and in most instances will not receive rainfall.

With regard to the size of pots usually used for indoor plants, the vast majority are 4" to 12" in diameter, with these containers typically ranging in depth from about 4" to 11".

As an example, one of the larger of these pots, some 10" in diameter, holds only about ⅓ of a cubic foot of potting soil. This is just a fraction of the volume of soil available to the same plant in the ground. To be noted therefore is the confinement a pot imposes on a plant and the importance of properly managing that tiny container of life-sustaining elements, compared to a plant growing in the ground.

There are of course many 4" potted plants, but practically speaking, these are not closely considered insofar as this invention is concerned. This is because the cost of manufacturing and marketing a feeder for a plant that small approaches the cost of the plant. Therefore, this invention may be regarded as largely being directed to a plant feeder that can, practically speaking, be utilized in connection with the vast majority of indoor potted plants, which are plants that reside in pots 6" to 12" in diameter.

I am mindful that certain pots or containers can be in the range of 12" to 14" in diameter, with it being obvious that containers of this size can be serviced by inserting two plant feeders in accordance with this invention. Larger containers, such as those 17" in diameter, may need three plant feeders.

Continuing with a discussion of the containers utilized, each plant depends in part on the potting soil for support in an upright position. It also depends on the soil moisture/nutrient holding capacity to sustain the plant between waterings and fertilizer applications. With these two points in consideration, it is apparent that within this small sphere of combined elements (plant/pot/soil/moisture/nutrients), the plant's ideal location is with the base or butt end of the plant placed approximately the upper half of the container or soil profile, with the roots located in the lower half of this structural profile.

The plant therefore receives some upright support around its base in the upper half of the pot/soil profile, with the plant roots located in the lower half of the profile serving at least two purposes:

1. Additional support by anchoring the plant.
2. Disposed in the area into which moisture and nutrients migrate, where they most effectively service the plant through its co-located roots.

The vast majority of potted plants are utilized with prepared planting soils selected for their moisture holding capability, with these soils usually consisting principally of peat moss. However, peat moss and most other elements used in potting soils normally are completely devoid of any nutritional value to a plant. The combination of soil elements is chosen to achieve a balance between holding moisture while at the same time providing a proper amount of drainage. The goal is of course to provide drainage to allow excess water to exit the bottom of the pot, yet hold enough moisture and applied nutrients to sustain the plant until the next watering/nutrient application.

It is to be realized that water and nutrients may be lumped together for a discussion of how, in combination with the potting soil, it forms a dynamic, every-changing structure. Water and nutrients almost universally enter this "assembly" from overhead. Water and nutrients are removed from this "assembly" in three ways:

1. Some water evaporates upward from the top portion of the potting soil.
2. Most water and nutrients gravity feed downward and some is taken up by the plant.
3. As water and nutrients gravity feed downward, excess drains out of the holes in the bottom of the pot.

The process set forth in these three items somewhat describes how when water evaporates from the top of the potting soil, and water and nutrients gravity feed from the upper portion to the lower portion, that there is an ever-changing structure that needs to be considered when designing a plant feeder. This moving line in the soil/water/nutrient structure is crucial to the health of the plant. Some plants require this "dry-down" of the potting soil because the roots of such plants are susceptible to root rot from a too-wet soil. Some plants have to endure this dry-down whether they need it or not, because the plant caretaker failed to accomplish the scheduled watering.

As previously mentioned, this ever-changing structure has an effect on long-term slow release fertilizer pellets. In accordance with the teachings of the prior art, these pellets have often been placed on the potting soil surface, or in other instances they have been buried in the top half of the soil profile. They are susceptible to cycling between wet and dry, and in such circumstance they manifestly will not work correctly.

It is to be kept in mind that extra long term pellets must be kept continually moist for several months in order that the coating will be penetrated, such that their nutrient release will begin in the last three to four months of a year-long mix of pellets. Some pellets release in the first three to four months, with others releasing in the middle months, with these various times of nutrient release in many instances continuing up to a full year.

In other words, a potted plant represents an ever-changing structure with the soil/water/nutrient assembly, and an effective plant feeder must be designed so that its structural relationship to that dynamic structure takes into account that to be effective, the pellets must reside in the lower part of the soil/water/nutrient structure. The surface area of the feeder must maximize exposure of the nutrients to the moist zone of the soil to maximize capillary action of the nutrients migrating out into the root zone. For this reason, it is desirable to push the envelope of that portion of the pellet holding volume of the plant feeder upwardly as far as possible without protruding too far into the "dry" zone.

It should now be apparent that there are a number of unique features of my novel feeder, which include the following:

1. The pointed end and the smooth sidewalls of the casing allows easy entry of fertilizer into the lower, moist zone of the soil.
2. Has reserve moisture retention sponge to assure correct operation of pellets.
3. Slender and pointed so does not damage confined roots or displace limited soil in a potted plant.
4. Puts pellets in most effective operating zone.
5. Reusable feeding apparatus, hidden from view, yet fits in most pots.
6. Eliminates plant killing salt build-up.
7. Tag to manage plant nutrition.

It is apparent that there are many shapes and sizes this feeder could have been designed to, but only a narrow range will functionally work. Following are a review of the parameters and the considerations affecting each:

The volume of the lower portion of the compartment 21 is essentially established by the size needed to accommodate a pellet volume likely to be effective, over a period of 12–16 months, but this lower portion of the feeder could be in many shapes. The biggest driver was the diameter which, when it became smaller and shaped the pellets into a slender column, increased the exposure the pellets had to the surrounding soil ensuring better performance. On the other hand, if the diameter became too small, it raised the column of pellets out of the moisture zone. Not only that, but the moist/dry demarcation line is a moving target, and it is at a different elevation, depending on the varying amounts of moisture, and on the different sized pots it is designed to service. So an average column height for the pellets had to be established, one that presented the least threat to the drying out of the pellets.

Another consideration was from the length standpoint, such that when my novel plant feeder is installed in a plant container, the plant feeder would be of such a length that as much of it as possible would be hidden below the surface of the potting soil. This being done so the feeder does not detract from the beauty of the plant.

An additional length consideration was for the feeder to be as long as practical, to increase the volume of the sponge as much as possible. This is done to substantially increase the moisture holding capability above the pellets, and of course this is done to protect the functionality of the slow-release pellets, as discussed previously.

If the diameter of this device results in reduction of volume of the sponge to half the volume of the pellets, this reduces its ability to hold much "contingency" water, therefore making it less effective.

Returning to a further consideration of the various lines of demarcation indicated in FIG. 1, it is important to note that once a periodic watering of the moisture retentive component 32 has taken place, it is still approximately 75% full of moisture by the time the line of demarcation has dropped down to the mid point of the container, indicated by line 46 in FIG. 1. As a matter of fact, the moisture retentive component is still approximately 50% full of moisture by the time the line of demarcation has moved approximately ¾ of the way down the container, to line 48 indicated in FIG. 1. Perhaps surprisingly, the component 32 is still approximately 25% full of moisture by the time the line of demarcation has reached the bottom of the container, with this arrangement thus assuring that the slow release fertilizer pellets will remain moist and maintain an uninterrupted release of nutrients to the plant despite substantial lapses of time in the application of water to the container.

It is thus to be seen that I have provided a carefully thought out, low cost plant feeder device advantageously compartmented so as to define an upper, sponge-containing portion and a lower portion containing slow-release fertilizer pellets, with the arrangement being such that the sponge-containing portion will assure a sufficient amount of moisture for proper activation of the pellets as will cause safe amounts of nutrition to be provided to the roots of a potted plant over a prolonged period of time.

By utilizing, in accordance with this invention, an advantageously placed, moisture-containing sponge to prevent the pellets from drying out and thus inhibiting their performance, the pellets can be expected to promptly start again in the supply of nutrition to the root zone of the plant when proper watering of the plant resumes. My novel, inexpensive plant feeder is thus intended for the long-term, low-maintenance and highly accurate feeding of potted plants, having the quality of being reusable. The feeder size, shape, capacity and capability are designed specifically to structurally relate to plant containers, potting soil, potting soil moisture content, plant root zone, and widely practiced watering techniques. This unique device, when installed in the soil of a potted plant, is essentially out of sight so that it does not detract from the eye-pleasing qualities of the plant. Furthermore, my novel apparatus uses readily available slow-release fertilizer pellets and can be effectively utilized by a person having no extensive prior knowledge of plant care.

I claim:

1. A plant feeder for supplying nutrition to a potted plant over a prolonged period of time, said feeder comprising a casing of a generally cylindrical configuration with an apertured upper end, and a somewhat pointed lower end to simplify the insertion of the feeder into the soil of a pot or other such container for a growing plant, said casing having an elongate internal compartment, a lower portion of said compartment adapted to contain a number of coated pellets involving slowly-releasable nutritional material, and an upper portion of said compartment being equipped with an elongate, moisture-retentive component intended to receive and retain a quantity of water, the pellets in said lower portion of said compartment being supplied with substantially constant amounts of moisture from said moisture retentive component, to cause a gradual internal dissolving and nutrient release of the coated pellets, said elongate moisture-retentive component being a sponge of a super saturating type, and a number of relatively small holes disposed in a lower part of said lower compartment so that nutrition from said slowly-releasing pellets can be steadily supplied in small quantities over a long time period to the soil of the pot or other container.

2. The plant feeder for supplying nutrition to a potted plant over a prolonged period of time as recited in claim 1 in which said elongate moisture-retentive component is fitted loosely in said upper portion of said compartment and upon being wetted, serves as a reserve source of water for providing an uninterrupted supply of moisture serving to keep the pellets of fertilizer wet and therefore effective, despite intermittent applications of water to the plant.

3. The plant feeder for supplying nutrition to a potted plant over a prolonged period of time as recited in claim 1 in which said elongate moisture-retentive component is of a length in the range of 10 to 15 times its width.

4. The plant feeder for supplying nutrition to a potted plant over a prolonged period of time as recited in claim 1 in which said upper portion of said compartment is approximately of a size equal to that of said lower portion of said compartment.

5. The plant feeder for supplying nutrition to a potted plant over a prolonged period of time as recited in claim 1 in which the volume of said upper portion of said compartment is larger than the volume of said lower portion, with the volume of said upper portion ranging in size up to 2.5 times as large as the volume of said lower portion of said compartment.

6. The plant feeder for supplying nutrition to a potted plant over a prolonged period of time as recited in claim 1 in which water enter said elongate internal compartment during periods of watering of the potted plant, with nutrient-containing moisture later escaping from said relatively small holes located in said lower portion of said casing, to keep the roots of the potted plant supplied with proper amounts of nutrients.

7. The plant feeder for supplying nutrition to a potted plant over a prolonged period of time as recited in claim 1 in which an information tag of durable construction is attached to the top of said feeder for the purpose of providing information as to the expiration date of the nutritional material of said pellets, said tag being designed to be relatively inconspicuous by lying flat against the surface of the surface of the potting soil when the feeder has been fully inserted into the soil.

8. A plant feeder for supplying nutrition to a potted plant over a prolonged period of time, said feeder comprising a casing of a generally cylindrical configuration with an apertured upper end, and a somewhat pointed lower end to simplify the insertion of the feeder into the soil of a pot or other such container for a growing plant, said apertured upper end being provided with a stopper having a passage therethrough to permit the entry of water into said internal compartment during the watering of the potted plant, said casing having an elongate internal compartment, a lower portion of said compartment adapted to contain a number of coated pellets involving slowly-releasable nutritional material, and an upper portion of said compartment being equipped with an elongate, moisture-retentive component intended to receive and retain a quantity of water, the pellets in said lower portion of said compartment being supplied with substantially constant amounts of moisture from said moisture retentive component, to cause a gradual internal dissolving and nutrient release of the coated pellets, and a number of relatively small holes disposed in a lower part of said lower compartment so that nutrition from said slowly-releasing pellets can be steadily supplied in small quantities over a long time period to the soil of the pot or other container.

9. The plant feeder for supplying nutrition to a potted plant over a prolonged period of time as recited in claim 8 in which a catch basin is disposed in said upper end of said elongate internal compartment, close to said stopper, said catch basin being adapted to receive water during the watering of the potted plant, said catch basin having a lower aperture to permit the flow of water into said moisture-retentive component.

10. The plant feeder for supplying nutrition to a potted plant over a prolonged period of time as recited in claim 9 in which said catch basin is of a construction integral with said stopper.

11. A plant feeder for supplying nutrition to a plant over a prolonged period of time by the use of extra long term, slow release fertilizer pellets that require substantially constant moisture for continual release of nutrients, which plant is growing in soil in a container that is less than approximately one foot in depth, and in which container a demarcation line may exist between soil located generally in the lower portion of the container that is acceptably moist to the fertilizer pellets, and unacceptably dry soil that from time to time may be located in the upper level of the container, which line of demarcation may move up or down the container as a result of the ever-changing amount of water present therein, said feeder comprising a casing of a generally cylindrical configuration with an apertured upper end, and a somewhat pointed lower end to simplify the insertion of the feeder into the soil of the container, among the roots of the plant, said casing having an elongate internal compartment, a lower portion of said compartment adapted to contain a number of coated pellets involving slowly-releasable nutritional material, and an upper portion of said compartment being equipped with a moisture-retentive component intended to receive and retain a reserve quantity of water, which component serves as a contingency reservoir for the gravity feeding of moisture to the pellets in said lower portion of said compartment, said moisture-retentive component being a sponge of a super-saturating type so that the pellets will be supplied with substantially constant amounts of moisture from said moisture-retentive component, to insure a gradual, uninterrupted, internal dissolving and nutrient release of said coated pellets, and a number of relatively small holes disposed in a lower part of said lower compartment so that nutrition from said slowly-releasing pellets can be steadily supplied in small quantities over a long time period to the soil of the container, thus to assure a proper and continuous amount of nutrition reaching the roots of the plant despite an intermittent application of water to the container.

12. The plant feeder for supplying nutrition to a plant over a prolonged period of time as recited in claim 11 in which said moisture-retentive component is fitted loosely in said upper portion of said compartment and presents surface exposure for maximum water absorption, said component serving as a reserve source of water for keeping the pellets of fertilizer wet during intermittent applications of water to the plant.

13. The plant feeder for supplying nutrition to a plant over a prolonged period of time as recited in claim 11 in which said elongate moisture-retentive component is of a length in the range of 10 to 15 times its width.

14. The plant feeder for supplying nutrition to a plant over a prolonged period of time as recited in claim 11 in which said upper portion of said compartment is approximately of a size equal to that of said lower portion of said compartment.

15. The plant feeder for supplying nutrition to a plant over a prolonged period of time as recited in claim 11 in which the volume of said upper portion of said compartment is larger than the volume of said lower portion, with the volume of said upper portion ranging in size up to 2.5 times as large as the volume of said lower portion of said compartment.

16. The plant feeder for supplying nutrition to a plant over a prolonged period of time as recited in claim 11 in which said apertured upper end is provided with a stopper having a passage therethrough to permit the entry of water into said internal compartment during the watering of the plant.

17. The plant feeder for supplying nutrition to a plant over a prolonged period of time as recited in claim 16 in which a catch basin is disposed in said upper end of said elongate internal compartment, close to said stopper, said catch basin being adapted to receive water during the watering of the plant, said catch basin having a lower aperture to permit the flow of water into said moisture-retentive component.

18. The plant feeder for supplying nutrition to a plant over a prolonged period of time as recited in claim 17 in which said catch basin is of a construction integral with said stopper.

19. The plant feeder for supplying nutrition to a plant over a prolonged period of time as recited in claim 11 in which substantial quantities of water enter said elongate internal compartment during periods of watering of the potted plant, with nutrient-containing moisture later escaping from said relatively small holes located in said lower portion of said casing, to keep the roots of the potted plant supplied with proper amounts of nutrients.

20. The plant feeder for supplying nutrition to a plant over a prolonged period of time as recited in claim 11 in which an information tag of durable construction is attached to the top of said feeder for the purpose of providing information as to the expiration date of the nutritional material of said pellets, said tag designed to be relatively inconspicuous by lying flat against the surface of the surface of the potting soil when the feeder has been fully inserted into the soil.

21. A plant feeder for supplying nutrition to a plant over a prolonged period of time by the use of extra long term, slow release fertilizer pellets of a type requiring substantially constant moisture for proper release of nutrients, which plant is growing in soil in a container that is less than approximately one foot in depth, and in which container a demarcation line may exist between the soil located generally in the lower portion of the container that is acceptably moist to the fertilizer pellets, and unacceptably dry soil that from time to time may be located in the upper level of the container, which line of demarcation may move up or down the container as a result of the ever-changing amount of water present therein, said feeder comprising a casing of a generally cylindrical configuration with an apertured upper end configured to receive a stopper, and a somewhat pointed lower end to simplify the insertion of the feeder into the soil of the container, among the roots of the plant, said casing having an elongate internal compartment, a lower portion of said compartment having apertures in its sidewall, with such lower portion of said compartment adapted to contain a number of coated pellets involving slowly-releasable nutritional material, and an upper portion of said compartment having an imperforate sidewall and being equipped with a moisture-retentive component intended to receive and retain a reserve quantity of water, said moisture retentive component being elongate and having a length in the range of 10 to 15 times its width and being isolated from direct contact with the soil of the container as a result of said imperforate sidewall, with said component being an elongate sponge of a super-saturating type, serving as a contingency reservoir for moisture, with this moisture feeding downwardly by gravity onto and around the pellets, the substantially constant amounts of moisture from said moisture retentive component causing a gradual internal dissolving and nutrient release of said coated pellets, the small holes disposed in the casing adjacent said lower compartment enabling nutrition from said slowly-releasing pellets to be steadily supplied in small quantities over a long time period to the soil of the container, thus to assure a proper and substantially continuous amount of health-giving nutrition reaching the roots of the plant despite the intermittent application of water to the container.

22. The plant feeder for supplying nutrition to a plant over a prolonged period of time as recited in claim 21 in which said elongate moisture-retentive component is fitted loosely in said upper portion of said compartment and upon being wetted, serves as a reserve source of water for providing an uninterrupted supply of moisture serving to keep the pellets of fertilizer wet and therefore effective, despite intermittent applications of water to the plant.

23. The plant feeder for supplying nutrition to a plant over a prolonged period of time as recited in claim 21 in which said moisture retentive component, once a periodic watering has taken place, is still approximately 75% full of moisture by the time the line of demarcation has dropped down to the mid point of the container, and still approximately 50% full of moisture by the time the line of demarcation has moved approximately ¾ of the way down the container, and still approximately 25% full of moisture by the time the line of demarcation has reached the bottom of the container, with this arrangement thus assuring that the slow release fertilizer pellets will remain moist and maintain an uninterrupted release of nutrients to the plant despite substantial lapses of time in the application of water to the container.

24. A plant feeder for supplying nutrition to a plant over a prolonged period of time by the use of extra long term, slow release fertilizer pellets of a type requiring substantially constant moisture for proper release of nutrients, which plant is growing in soil in a container that is less than approximately one foot in depth, and in which container a demarcation line may exist between the soil located generally in the lower portion of the container that is acceptably moist to the fertilizer pellets, and unacceptably dry soil that from time to time may be located in the upper level of the container, which line of demarcation may move up or down the container as a result of the ever-changing amount of water present therein, said feeder comprising a casing of a generally cylindrical configuration with an apertured upper end configured to receive a stopper, said apertured upper end being provided with a stopper, said stopper having a passage therethrough to permit the entry of water into said internal compartment during the watering of the plant, and a somewhat pointed lower end to simplify the insertion of the feeder into the soil of the container, among the roots of the plant, said casing having an elongate internal compartment, a lower portion of said compartment having apertures in its sidewall, with such lower portion of said compartment adapted to contain a number of coated pellets involving slowly-releasable nutritional material, and an upper portion of said compartment having an imperforate sidewall and being equipped with a moisture-retentive component intended to receive and retain a reserve quantity of water, said moisture retentive component being elongate and having a length in the range of 10 to 15 times its width and being isolated from direct contact with the soil of the container as a result of said imperforate sidewall, with said component serving as a contingency reservoir for moisture, with this moisture feeding downwardly by gravity onto and around the pellets, the substantially constant amounts of moisture from said moisture retentive component causing a gradual internal dissolving and nutrient release of said coated pellets, the small holes disposed in the casing adjacent said lower compartment enabling nutrition from said slowly-releasing pellets to be steadily supplied in small quantities over a long time period to the soil of the container, thus to assure a proper and substantially continuous amount of health-giving nutrition reaching the roots of the plant despite the intermittent application of water to the container.

25. A plant feeder for supplying nutrition to a plant over a prolonged period of time by the use of extra long term, slow release fertilizer pellets of a type requiring substantially constant moisture for proper release of nutrients, which plant is growing in soil in a container that is less than approximately one foot in depth, and in which container a demarcation line may exist between the soil located generally in the lower portion of the container that is acceptably moist to the fertilizer pellets, and unacceptably dry soil that from time to time may be located in the upper level of the container, which line of demarcation may move up or down the container as a result of the ever-changing amount of water present therein, said feeder comprising a casing of a generally cylindrical configuration with an apertured upper end configured to receive a stopper, a catch basin being disposed in said upper end of said elongate internal compartment, close to said stopper, said catch basin being adapted to receive water during the watering of the plant, said catch basin having a lower aperture to permit the flow of water into said moisture-retentive component, and a somewhat pointed lower end to simplify the insertion of the feeder into the soil of the container, among the roots of the plant, said casing having an elongate internal compartment, a lower portion of said compartment having apertures in its sidewall, with such lower portion of said compartment adapted to contain a number of coated pellets involving slowly-releasable nutritional material, and an upper portion of said compartment having an imperforate sidewall and being equipped with a moisture-retentive component intended to receive and retain a reserve quantity of water, said moisture retentive component being elongate and having a length in the range of 10 to 15 times its width and being isolated from direct contact with the soil of the container as a result of said imperforate sidewall, with said component serving as a contingency reservoir for moisture, with this moisture feeding downwardly by gravity onto and around the pellets, the substantially constant amounts of moisture from said moisture retentive component causing a gradual internal dissolving and nutrient release of said coated pellets, the small holes disposed in the casing adjacent said lower compartment enabling nutrition from said slowly-releasing pellets to be steadily supplied in small quantities over a long time period to the soil of the container, thus to assure a proper and substantially continuous amount of health-giving nutrition reaching the roots of the plant despite the intermittent application of water to the container.

26. The plant feeder for supplying nutrition to a plant over a prolonged period of time as recited in claim 25 in which said catch basin is of a construction integral with said stopper.

27. A plant feeder for supplying nutrition to a potted plant over a prolonged period of time, said feeder comprising a casing of a generally cylindrical configuration with an apertured upper end, and a somewhat pointed lower end to simplify the insertion of the feeder into the soil of a container for a growing plant, said casing being equipped with a number of small holes disposed along said casing, said casing having an elongate internal compartment, with which at least some of said holes are in contact, a lower portion of said compartment adapted to contain a number of coated pellets involving slowly-releasable nutritional material, and an upper portion of said compartment being equipped with an elongate, moisture-retentive component intended to receive incidental moisture applied to the soil in the container and maintain a moist condition, said moisture-retentive component serving as an adjacent, moist body to ensure that the uppermost pellets do not dry out and cease providing a constant and steady release of nutrients, the pellets in said lower portion of said compartment being supplied with substantially constant amounts of moisture received from the surrounding moisture-laden soil of said container through the small holes disposed in the lower part of said lower compartment, to activate and cause nutrition from said slow-release pellets to be steadily supplied by capillary action in small quantities over a long time period back into the soil of the container.

28. The plant feeder for supplying nutrition to a potted plant over a prolonged period of time as recited in claim 27 in which said elongate moisture-retentive component is fitted loosely in said upper portion of said compartment such that incidentally applied water can cascade down the sides and length of said moisture-retentive component to thoroughly wet it, and upon being wetted, said component serves as a moist body residing on top of the pellets to keep the nutritional material wet and therefore effective, despite intermittent applications of water to the plant.

29. The plant feeder for supplying nutrition to a potted plant over a prolonged period of time as recited in claim 27 in which water enters said elongate internal compartment by capillary action through said small holes during periods of watering of the potted plant, with nutrient-containing moisture later escaping back out through holes located in said lower portion of said casing, to keep the roots of the potted plant supplied with proper amounts of nutrients.

* * * * *